(12) United States Patent
Jang

(10) Patent No.: US 12,166,844 B2
(45) Date of Patent: Dec. 10, 2024

(54) INTELLIGENT SCHEDULING APPARATUS AND METHOD

(71) Applicant: ELECTRONICS AND TELECOMMUNICATIONS RESEARCH INSTITUTE, Daejeon (KR)

(72) Inventor: Su-Min Jang, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/492,968

(22) Filed: Oct. 24, 2023

(65) Prior Publication Data
US 2024/0073298 A1    Feb. 29, 2024

Related U.S. Application Data

(63) Continuation of application No. 17/242,659, filed on Apr. 28, 2021, now Pat. No. 11,838,384.

(30) Foreign Application Priority Data

Jul. 3, 2020 (KR) .................. 10-2020-0082031
Sep. 17, 2020 (KR) .................. 10-2020-0120006

(51) Int. Cl.
*H04L 67/60* (2022.01)
*G06N 3/08* (2023.01)
*H04L 67/1008* (2022.01)

(52) U.S. Cl.
CPC ............... *H04L 67/60* (2022.05); *G06N 3/08* (2013.01); *H04L 67/1008* (2013.01)

(58) Field of Classification Search
None
See application file for complete search history.

(56) References Cited

U.S. PATENT DOCUMENTS 10,264,063 B2    4/2019   Wang et al.
11,044,162 B2 *  6/2021   Byers .................. H04L 41/0893
(Continued)

FOREIGN PATENT DOCUMENTS

CN         111262906 A      6/2020
EP         3 637 730 B1     1/2021
(Continued)

OTHER PUBLICATIONS

'Edge Intelligence: Paving the Last Mile of Artificial Intelligence With Edge Computing' by Zhi Zhou et al. Proceedings of the IEEE | vol. 107, No. 8, Aug. 2019. (Year: 2019).*
(Continued)

*Primary Examiner* — Steven G Snyder
(74) *Attorney, Agent, or Firm* — LRK PATENT LAW FIRM

(57) ABSTRACT

Disclosed herein are an intelligent scheduling apparatus and method. The intelligent scheduling apparatus includes one or more processors, and an execution memory for storing at least program that is executed by the one or more processors, wherein the at least one program is configured to, in a hybrid cloud environment including a cloud, an edge system, and a near-edge system, configure schedulers for scheduling tasks of the cloud, the edge system, and the near-edge systems, store data, requested by a client, in a work queue by controlling the schedulers based on a scheduler policy and process the tasks based on data stored in the work queue, and collect history data resulting from processing of the tasks depending on the scheduler policy, and train the scheduler policy based on the history data.

4 Claims, 16 Drawing Sheets

(56) References Cited

U.S. PATENT DOCUMENTS

| | | | | |
|---|---|---|---|---|
| 11,055,135 | B2* | 7/2021 | Popovic | H04L 41/0806 |
| 11,127,107 | B2* | 9/2021 | Iyer | G06F 9/5027 |
| 11,405,449 | B1* | 8/2022 | Saraya | H04L 63/10 |
| 11,509,599 | B1* | 11/2022 | Nijim | G06F 9/45558 |
| 11,593,909 | B2* | 2/2023 | Iyer | G06F 9/5072 |
| 11,916,998 | B2* | 2/2024 | Kim | H04L 67/10 |
| 12,107,915 | B2* | 10/2024 | Kim | H04L 41/0654 |
| 2016/0197834 | A1* | 7/2016 | Luft | H04L 12/46 709/223 |
| 2018/0159745 | A1* | 6/2018 | Byers | H04L 41/12 |
| 2018/0349183 | A1* | 12/2018 | Popovic | H04L 41/0806 |
| 2019/0098104 | A1 | 3/2019 | Kim et al. | |
| 2019/0116128 | A1 | 4/2019 | Guo et al. | |
| 2019/0208467 | A1* | 7/2019 | Lu | H04L 67/1025 |
| 2020/0007409 | A1 | 1/2020 | Kim et al. | |
| 2020/0136992 | A1* | 4/2020 | Denninnart | H04L 47/781 |
| 2020/0169857 | A1 | 5/2020 | Yang et al. | |
| 2020/0177671 | A1 | 6/2020 | Tofighbakhsh et al. | |
| 2021/0097641 | A1* | 4/2021 | Iyer | A63F 13/355 |
| 2021/0117249 | A1* | 4/2021 | Doshi | H04L 67/1001 |
| 2021/0144198 | A1* | 5/2021 | Yu | H04W 28/0967 |
| 2022/0148123 | A1* | 5/2022 | Iyer | G06F 9/5027 |
| 2023/0110752 | A1* | 4/2023 | Wolman | H04L 47/767 370/235 |
| 2023/0119552 | A1* | 4/2023 | Doshi | H04L 47/783 709/226 |
| 2023/0156074 | A1* | 5/2023 | Kim | H04L 12/4633 709/201 |
| 2023/0412671 | A1* | 12/2023 | Kim | H04L 41/0654 |

FOREIGN PATENT DOCUMENTS

| | | |
|---|---|---|
| KR | 10-2018-0031546 A | 3/2018 |
| KR | 10-2018-0047070 A | 5/2018 |
| KR | 10-2020-0044200 A | 4/2020 |

OTHER PUBLICATIONS

'Flexential Partners with EdgeMicro to Test Groundbreaking Edge Computing Pilot Projects' by Flexential, Jan. 21, 2019. (Year: 2019).*

'What the FAQ is the Edge vs. the Far Edge?' by Max Maxfield, Nov. 7, 2019. (Year: 2019).*

'Edge Computing in Industrial Internet of Things: Architecture, Advances and Challenges' by Tie Qiu et al. IEEE Communications Surveys & Tutorials, vol. 22, No. 4, Fourth Quarter 2020, published Jul. 14, 2020. (Year: 2020).*

'High-Level Architecture of Serverless Edge Computing Networks and its Requirements' by Mark Soelman et al., May 8, 2020. (Year: 2020).*

'Cloud, Fog and Edge Computing—What's the Difference?' by WinSystems Dec. 4, 2017. (Year: 2017).*

Machine Translation of WIPO Publication WO 2021213004 A1, 2021. (Year: 2021).*

Machine Translation of Chinese Patent Application CN 115086720 A, 2022. (Year: 2022).*

* cited by examiner

INTELLIGENT SCHEDULING APPARATUS AND METHOD

CROSS REFERENCE TO RELATED APPLICATIONS

This application is a continuation of U.S. patent application Ser. No. 17/242,659, filed on Apr. 28, 2021, which claims the benefit of Korean Patent Application Nos. 10-2020-0082031, filed Jul. 3, 2020, and 10-2020-0120006, filed Sep. 17, 2020, which are hereby incorporated by reference in their entireties into this application.

BACKGROUND OF THE INVENTION

1. Technical Field

The present invention relates generally to cloud-computing technology and, more particularly, to intelligent scheduling technology for providing service in an environment in which a cloud system and an edge system are combined with each other.

2. Description of Related Art

Recently, through cloud computing, various types of services, such as servers, storage, software, big-data analysis, and artificial intelligence service, have been provided. However, as the number of users who require cloud service increases, a problem arises in that a service delay occurs due to a procedure for analyzing and transmitting collected data. Also, a security problem occurring in a process for data communication between a user and a cloud is an issue that remains to be solved. In order to solve problems related to data-processing speed, capacity, and security, an efficient method for computing service technology in which a cloud system and an edge system are integrated is required.

In cloud computing, data is processed by a data center, but in edge computing, data is processed at locations closer to terminals so as to overcome a processing and transmission delay caused by cloud concentration occurring due to a large amount of data generated by large-scale edge terminals.

Here, there is required an intelligent edge software (SW) platform that supports response speed-sensitive service based on distributed collaboration among the cloud-edge terminals.

However, a conventional edge system is problematic in that service is provided in a form in which it is not optimized for service features and resource provision, performance optimization is not taken into consideration in that resources are separately deployed for respective execution types, only partial vertical collaboration is provided, a dependent service limited to an existing monolithic application and microservice type execution form is provided, a resource addition method for guaranteeing performance when the amount of available resources is insufficient is not provided, and design must be performed at the level of an application for vertical/horizontal collaboration.

Meanwhile, Korean Patent Application Publication No. 10-2018-0031546, entitled "Method and Apparatus for Scheduling Cloud Servers" discloses an apparatus and method which allow cloud servers for performing tasks acquired from cloud server clusters to schedule the tasks in response to information indicating that the current time is in the pre-set time period.

However, Korean Patent Application Publication No. 10-2018-0031546 does not disclose task scheduling in a cloud-edge hybrid environment in which a cloud and an edge system are mixed with each other.

SUMMARY OF THE INVENTION

Accordingly, the present invention has been made keeping in mind the above problems occurring in the prior art, and an object of the present invention is to provide intelligent scheduling for optimizing vertical and horizontal cloud-edge collaboration.

Another object of the present invention is to provide augmented reality (AR)/virtual reality (VR), video surveillance, emergency disaster management service, and ultra-low latency intelligent information service requiring high response speeds, such as a smart city and a connected car, by optimizing vertical and horizontal cloud-edge collaboration.

A further object of the present invention is to generate an efficient intelligent scheduler policy based on integrated distributed processing, including a cloud, an edge, and a near edge, and logs or statistical information.

In accordance with an aspect of the present invention to accomplish the above objects, there is provided an intelligent scheduling apparatus, including one or more processors, and an execution memory for storing at least program that is executed by the one or more processors, wherein the at least one program is configured to in a hybrid cloud environment including a cloud, an edge system, and a near-edge system, configure schedulers for scheduling tasks of the cloud, the edge system, and the near-edge systems, store data, requested by a client, in a work queue by controlling the schedulers based on a scheduler policy and process the tasks based on data stored in the work queue, and collect history data resulting from processing of the tasks depending on the scheduler policy, and train the scheduler policy based on the history data.

The at least one program may be configured to configure the schedulers so that the tasks are processed using at least one of series connection and parallel connection of the schedulers.

The at least one program may be configured to configure the schedulers so that the tasks are complexly processed using both the series connection and parallel connection of the schedulers.

The at least one program may be configured to sequentially transfer the tasks to the schedulers depending on whether resource allocation by schedulers configured in the series connection has succeeded.

The at least one program may be configured to request an identical task from at least two of schedulers configured in parallel connection and transfer the tasks to an optimal scheduler determined to be any one of the at least two schedulers.

The at least one program may be configured to store data, requested by the client, in multiple work queues according to a priority and schedule the data stored in the work queues.

The at least one program may be configured to, when a number of failures in a work request for the data requested by the client is equal to or greater than a preset number of times, store the data in a work queue for processing the work request with higher priority.

The at least one program may be configured to, when a number of failures in scheduling of the data stored in a corresponding work queue is equal to or greater than a preset number of times, transfer the data to a subsequent work queue, and perform scheduling on the data transferred to the subsequent work queue.

The at least one program may be configured to collect resource information of the cloud, the edge system, and the near-edge system, and generate the history data from the resource information and results of running the scheduler policy.

The at least one program may be configured to establish a running plan for the scheduler policy based on the resource information, and train the scheduler policy from results of applying the scheduler policy running plan.

In accordance with another aspect of the present invention to accomplish the above objects, there is provided an intelligent scheduling method performed by an intelligent scheduling apparatus, including, in a hybrid cloud environment including a cloud, an edge system, and a near-edge system, configuring schedulers for scheduling tasks of the cloud, the edge system, and the near-edge systems, storing data, requested by a client, in a work queue by controlling the schedulers based on a scheduler policy, and processing the tasks based on data stored in the work queue, and collecting history data resulting from processing of the tasks depending on the scheduler policy, and training the scheduler policy based on the history data.

Configuring the schedulers may be performed to configure the schedulers so that the tasks are processed using at least one of series connection and parallel connection of the schedulers.

Configuring the schedulers may be performed to configure the schedulers so that the tasks are complexly processed using both the series connection and parallel connection of the schedulers.

Configuring the schedulers may be configured to sequentially transfer the tasks to the schedulers depending on whether resource allocation by schedulers configured in the series connection has succeeded.

Configuring the schedulers may be configured to request an identical task from at least two of schedulers configured in parallel connection and transfer the tasks to an optimal scheduler determined to be any one of the at least two schedulers.

Processing the tasks may be configured to store data, requested by the client, in multiple work queues according to a priority and schedule the data stored in the work queues.

Processing the tasks may be configured to, when a number of failures in a work request for the data requested by the client is equal to or greater than a preset number of times, store the data in a work queue for processing the work request with higher priority.

Processing the tasks may be configured to, when a number of failures in scheduling of the data stored in a corresponding work queue is equal to or greater than a preset number of times, transfer the data to a subsequent work queue, and perform scheduling on the data transferred to the subsequent work queue.

Training the scheduler policy may be configured to collect resource information of the cloud, the edge system, and the near-edge system, and generate the history data from the resource information and results of running the scheduler policy.

Training the scheduler policy may be configured to establish a running plan for the scheduler policy based on the resource information, and train the scheduler policy from results of applying the scheduler policy running plan.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
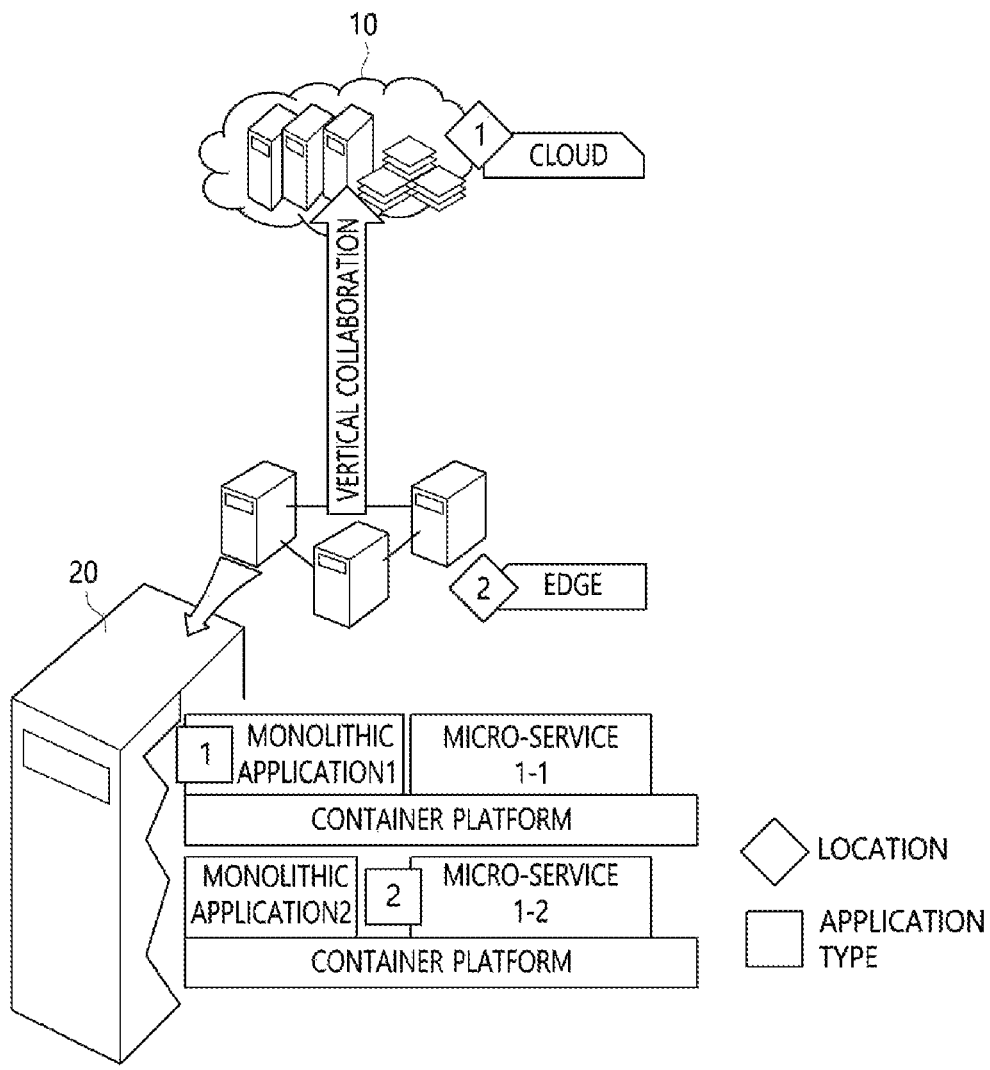
FIG. 1 is a diagram illustrating an edge service system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with the attached drawings.

Figure 2:
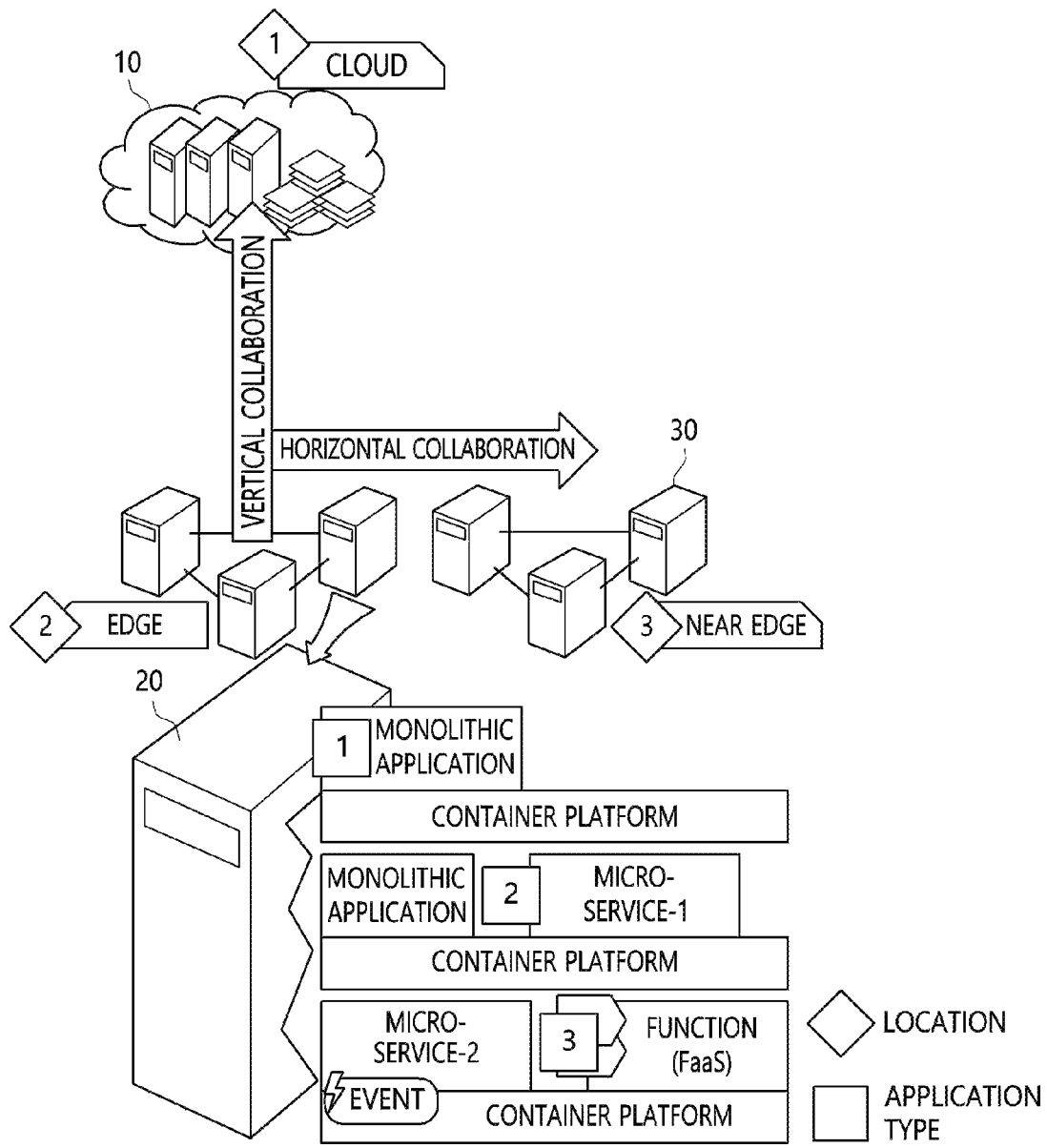
FIG. 2 is a diagram illustrating 3 Locations, 3 Application Types (3LT) configuration of an edge service system according to an embodiment of the present invention.

FIG. 1 is a diagram illustrating an edge service system according to an embodiment of the present invention, and FIG. 2 is a diagram illustrating 3 Locations, 3 Application Types (3LT) configuration of an edge service system according to an embodiment of the present invention.

Referring to FIG. 1, the edge service system may be implemented as a hybrid cloud of a cloud 10 and an edge system 20.

Referring to FIG. 2, the edge service system according to an embodiment of the present invention indicates a hybrid cloud environment including three locations in which a near-edge system 30, together with the cloud 10 and the edge system 20, is taken into consideration.

The edge service system according to an embodiment of the present invention may provide three application types.

The three application types may include monolithic application (App), a micro-service, and a Function as a Service (FaaS).

It can be seen that the three application types have different properties, as shown in the following Table 1, from the standpoint of complexity of an application, service scale, and a resource usage form. The edge service system according to the embodiment of the present invention needs to effectively apply a function such as mutual collaboration or service movement in which the above-described properties are desirably reflected.

TABLE 1

| | Complexity | Scale | Resource usage form |
|---|---|---|---|
| Monolithic application | Simple | Middle | Always uses resources |
| Micro-service | Complicated | Large | Enables expansion/reduction of partial resource usage |
| FaaS | Simple | Small | Temporarily uses resources |

The edge service system according to an embodiment of the present invention may support optimization of vertical and horizontal collaboration based on 3 Locations, 3 Application Types (3LAT).

Figure 3:
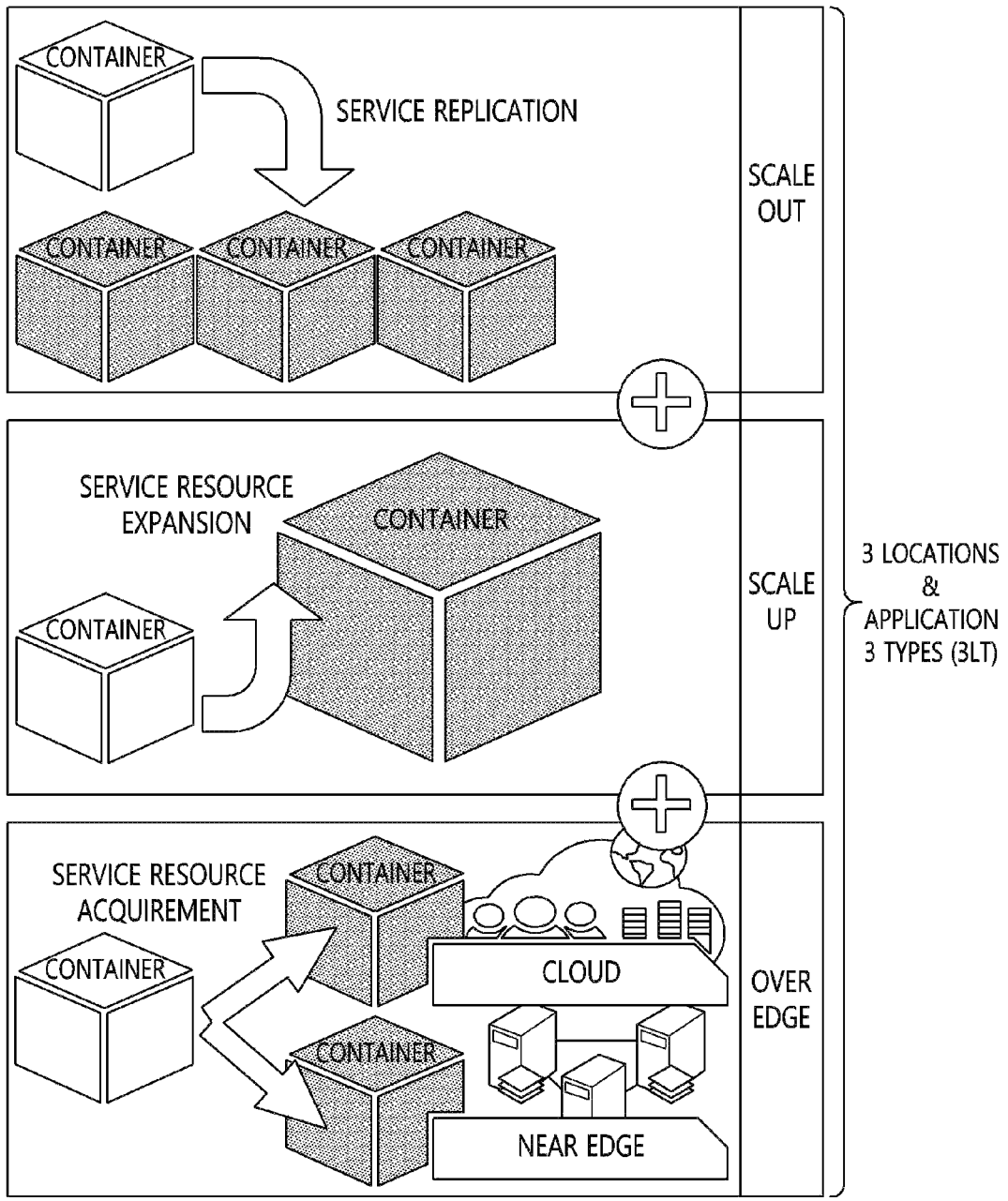
FIG. 3 is a diagram illustrating the concept of an edge service enabling vertical and horizontal collaboration according to an embodiment of the present invention.

FIG. 3 is a diagram illustrating the concept of an edge service enabling vertical and horizontal collaboration according to an embodiment of the present invention.

Referring to FIG. 3, the edge service system according to an embodiment of the present invention indicates an architecture that enables various types of vertical and horizontal collaboration regardless of location or service type.

The edge service system according to an embodiment of the present invention may provide scale-out using 3 locations (3L), scale-up using 3L, and a prediction-type over-edge using 3L.

The intelligent scheduling apparatus and method according to embodiments of the present invention may be applied, as an edge service system for providing an edge service, to the above-described hybrid cloud environment, and detailed descriptions of the intelligent scheduling apparatus and method will be made below.

Figure 4:
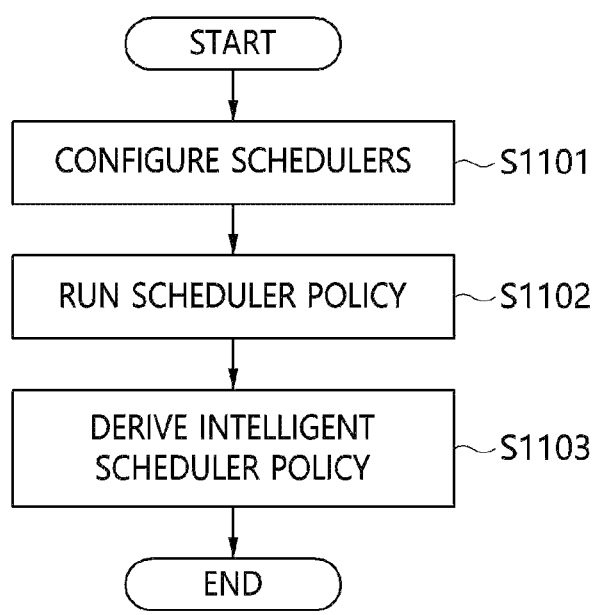
FIG. 4 is an operation flowchart illustrating an intelligent scheduling method according to an embodiment of the present invention.

FIG. 4 is an operation flowchart illustrating an intelligent scheduling method according to an embodiment of the present invention.

Referring to FIG. 4, the intelligent scheduling method according to the embodiment of the present invention may first configure schedulers at step S1101.

That is, at step S1101, in a hybrid cloud environment including a cloud, an edge system, and a near-edge system, schedulers for scheduling tasks of the cloud, the edge system, and the near-edge system may be configured.

At step S1101, the schedulers may be configured to process tasks using at least one of series connection and parallel connection of the schedulers.

At step S1101, the schedulers may be configured to complexly process the tasks using both series connection and parallel connection of the schedulers.

Further, at step S1101, tasks may be sequentially transferred to the schedulers depending on whether allocation of resources by the schedulers configured in series connection has succeeded.

Here, at step S1101, the same task may be requested from at least two schedulers, among multiple schedulers configured in parallel connection, and the corresponding tasks may be transferred to an optimal scheduler determined to be one of the at least two schedulers.

Also, the intelligent scheduling method according to the embodiment of the present invention may run a scheduler policy at step S1102.

That is, at step S1102, data requested by a client may be stored in a request queue by controlling the schedulers based on the scheduler policy, and the tasks may be processed by scheduling data, stored in the request queue, in a work queue (task queue).

Here, at step S1102, data requested by the client may be stored according to priority in multiple work queues, and the data stored in the work queues may be scheduled.

Here, at step S1102, when the number of failures in a work (task) request for the data requested by the client is equal to or greater than the preset number of times, the data may be stored in a work queue for which the work request is to be processed with priority.

At step S1102, when the number of failures in scheduling of data stored in the work queue is equal to or greater than the preset number of times, the data may be transferred to a subsequent work queue, and the transferred data may be scheduled.

Furthermore, the intelligent scheduling method according to the embodiment of the present invention may derive an intelligent scheduler policy at step S1103.

That is, at step S1103, history data resulting from processing of the tasks may be collected based on the scheduler policy, and the scheduler policy may be trained based on the history data.

Here, at step S1103, the resource information of the cloud, the edge system, and the near-edge system may be collected, and the history data may be generated from the resource information and the results of running the scheduler policy.

Here, at step S1103, a plan for running the scheduler policy may be established based on the resource information, and the scheduler policy may be trained based on the results of applying the running plan for the scheduler policy.

Figure 5:
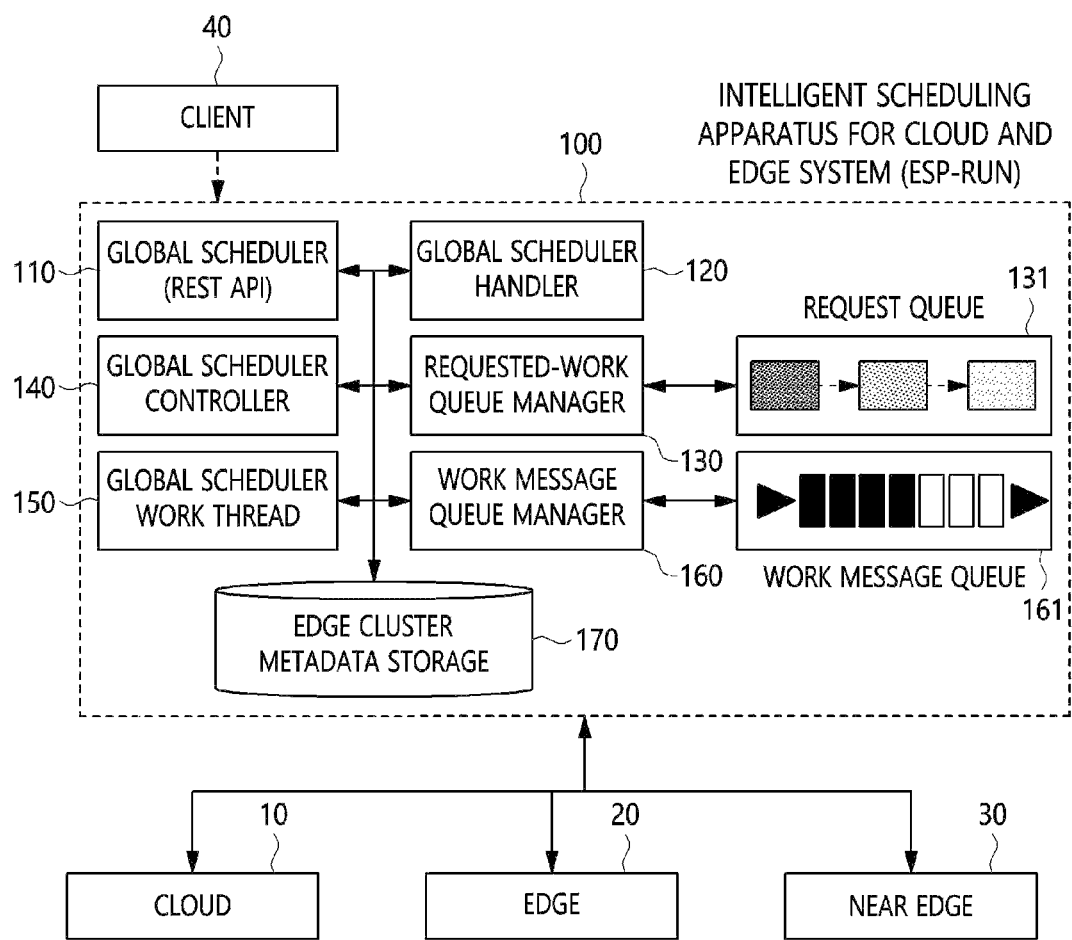
FIG. 5 is a block diagram illustrating an intelligent scheduling apparatus according to an embodiment of the present invention.
Figure 6:
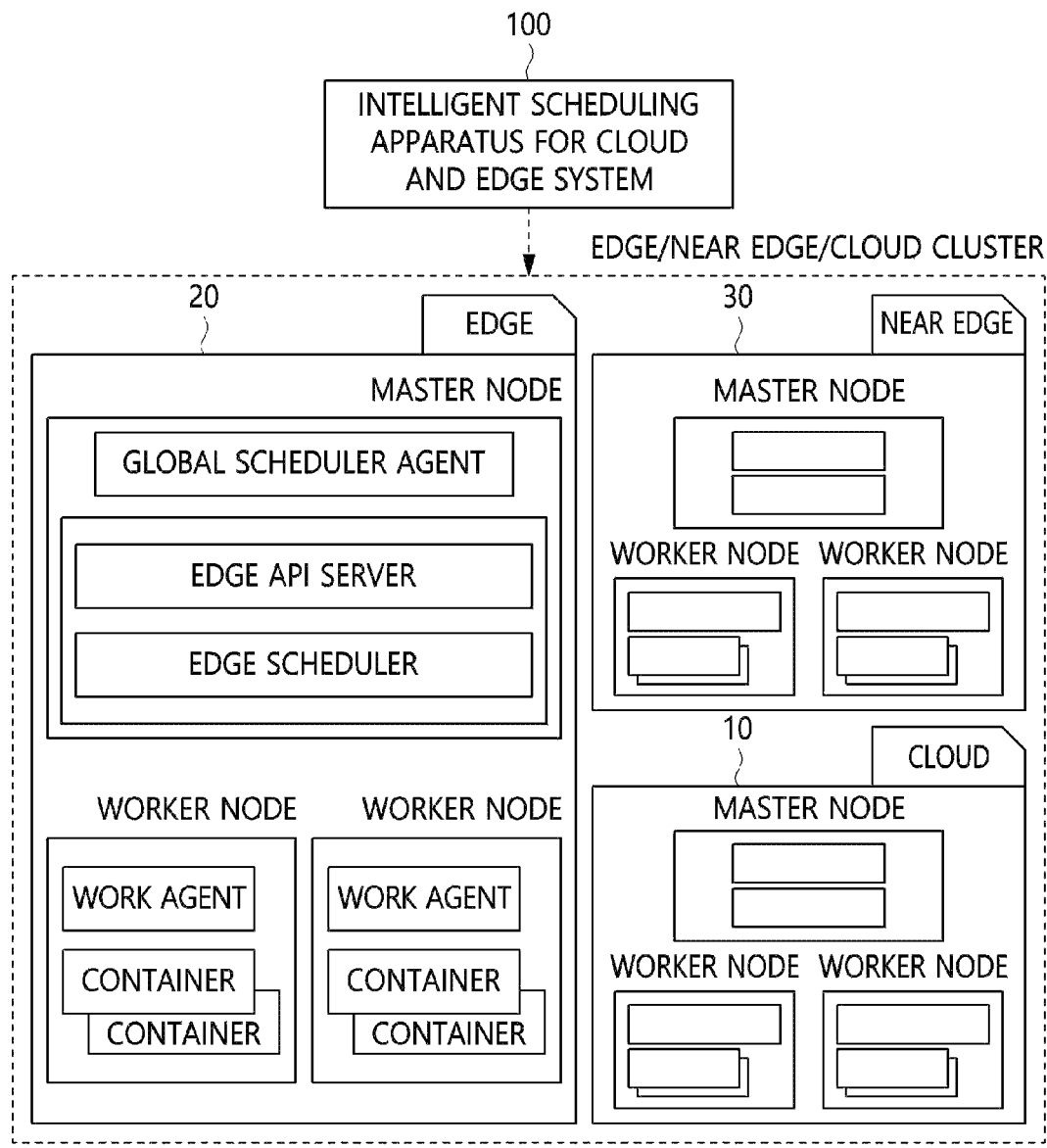
FIG. 6 is a block diagram illustrating a cloud, an edge, and a near edge associated with an intelligent scheduling apparatus according to an embodiment of the present invention.

FIG. 5 is a block diagram illustrating an intelligent scheduling apparatus according to an embodiment of the present invention, and FIG. 6 is a block diagram illustrating a cloud, an edge, and a near edge associated with an intelligent scheduling apparatus according to an embodiment of the present invention.

Referring to FIG. 5, an intelligent scheduling apparatus 100 according to the embodiment of the present invention may include a global scheduler 110, a global scheduler handler 120, a requested-work queue manager 130, a request queue 131, a global scheduler controller 140, a global scheduler work thread 150, a work message queue manager 160, a work message queue 161, and an edge cluster metadata storage 170.

The global scheduler 110 may include a REpresentational State Transfer (REST) Application Programming Interface (API) corresponding to a scheduler which requests the assignment of a related application container from a user interface or an instruction tool.

The global scheduler handler 120 may process a global scheduler REST API.

The requested-work queue manager 130 may receive container assignment requests from the global scheduler handler 120, and may store and manage the corresponding data related to the assignment requests in the request queue 131.

The global scheduler controller 140 may fetch scheduling request data from the request queue 131, and may generate and execute a global scheduler work thread.

The global scheduler work thread 150 may substantially convert a scheduler task (work) into the format of a message to be sent to the global scheduler agent of the corresponding master node, and may store the converted message in the work message queue 161 through the work message queue manager 160.

The work message queue 161 may store scheduler work messages between the intelligent scheduling apparatus 100 and clusters 10, 20, and 30.

The edge cluster metadata storage 170 may store pieces of metadata related to edge clusters.

Referring to FIG. 6, a cloud 10, an edge system 20, and a near-edge system 30, which are clusters associated with the intelligent scheduling apparatus 100, are depicted.

The global scheduler agent of the edge system 20 may receive a scheduler work message corresponding thereto from the work message queue 161 in the master node of the cluster 10, and may make a REST API call.

The edge (cloud) scheduler may sense a container that is not assigned, and may select a worker node which will execute the container.

A worker agent may execute the container in the worker node.

Figure 7:
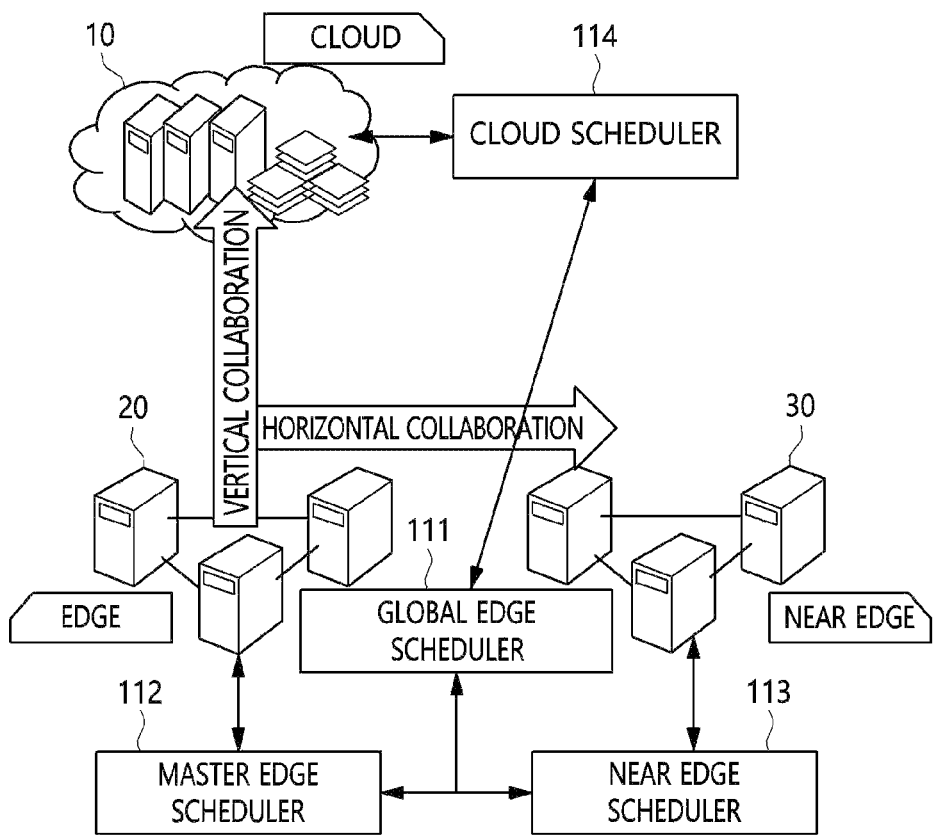
FIG. 7 is a diagram illustrating schedulers of an edge service system according to an embodiment of the present invention.

FIG. 7 is a diagram illustrating schedulers of an edge service system according to an embodiment of the present invention.

Referring to FIG. 7, the schedulers of the edge service system according to an embodiment of the present invention are depicted.

The schedulers according to the embodiment of the present invention may include a scheduler that can dynamically establish a policy, an intelligent scheduler based on analysis of log data, and schedulers which can minimize costs attributable to the change of a scheduling policy and minimize waiting time and latency.

A work target for the schedulers according to an embodiment of the present invention may include a resident container for executing a monolithic application or a microservice, and a non-resident container for executing a Function as a Service (FaaS).

The schedulers according to an embodiment of the present invention may include the global edge scheduler 111 corresponding to the above-described 3 locations and three types of schedulers 112, 113, and 114, as illustrated in FIG. 7.

The global edge scheduler 111 may correspond to a scheduler for operating in conjunction with a master edge scheduler 112, a near edge scheduler 113, and a cloud scheduler 114, and may also correspond to a global scheduler 110 included in the intelligent scheduling apparatus 100.

The master edge scheduler 112 may correspond to a scheduler included in an edge (master edge) system 20 in which a main service is executed.

The near edge scheduler 113 may correspond to a scheduler included in the near-edge system 30 present near the master edge.

The cloud scheduler 114 may correspond to a scheduler included in a public/private cloud 10.

Figure 8:
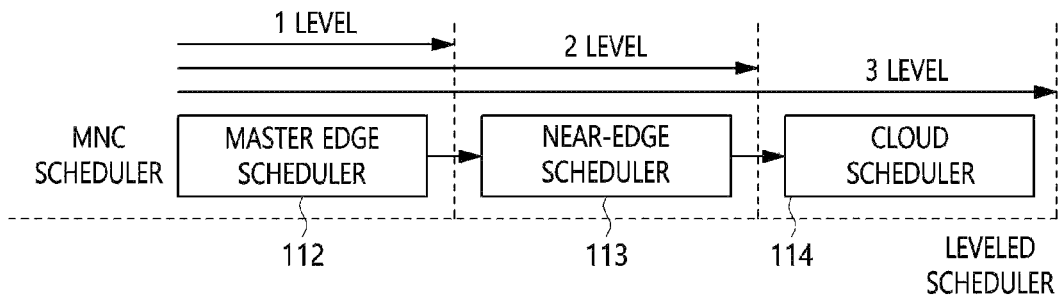
FIG. 8 is a diagram illustrating an example in which the schedulers of the edge service system illustrated in FIG. 7 are implemented as a leveled scheduler.

FIG. 8 is a diagram illustrating an example in which the schedulers of the edge service system illustrated in FIG. 7 are implemented as a leveled scheduler.

Horizontal/vertical collaboration may be applied to an edge service for configuring schedulers according to an embodiment of the present invention at the system level. For this operation, schedulers according to the embodiment of the present invention may provide series-connection configuration, such a leveled scheduler, and a parallel-connection configuration, such as a shared scheduler. The leveled scheduler may have a series-connection configuration for sequential processing of schedulers, and the shared scheduler may have a parallel-connection configuration in which schedulers contend with each other to find an optimal condition.

Referring to FIG. 8, an example of configuration of the leveled scheduler is illustrated, wherein a 3-leveled scheduler having a series-connection configuration in which schedulers are connected in series in the order of a master edge scheduler 112, a near edge scheduler 113, and a cloud scheduler 114 is depicted.

For example, when allocation of resources by the master edge scheduler 112 corresponding to a first level succeeds, the global edge scheduler 111 may skip the execution of second and third level schedulers. However, when the allocation of resources by the master edge scheduler 112 corresponding to the first level fails, the global edge scheduler 111 may sequentially transfer tasks (work) to the near edge scheduler 113 that is a second level scheduler corresponding to a subsequent level or to a cloud scheduler 114 that is a third level scheduler. A service developer may apply edge service load distribution and collaboration between services at the system level using the leveled scheduler.

Figure 9:
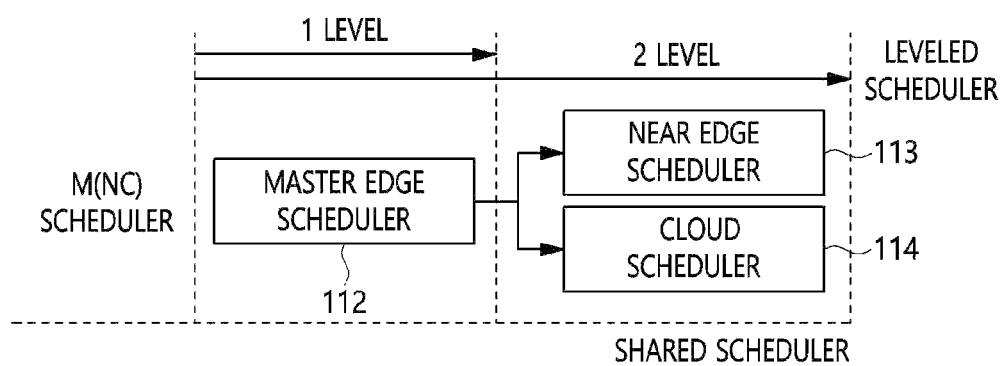
FIG. 9 is a diagram illustrating in detail an example in which the schedulers of the edge service system illustrated in FIG. 7 are implemented in a complex configuration in which a leveled scheduler and a shared scheduler are combined with each other.

FIG. 9 is a diagram illustrating in detail an example in which the schedulers of the edge service system illustrated in FIG. 7 are implemented in a complex configuration in which a leveled scheduler and a shared scheduler are combined with each other.

Referring to FIG. 9, a complex configuration in which the leveled scheduler and the shared scheduler are combined with each other is illustrated.

Here, it can be seen that the leveled scheduler is configured in a 2-level structure while a shared scheduler is configured between a near edge scheduler 113 and a cloud scheduler 114 at a second level.

The shared scheduler may simultaneously request a task from two or more schedulers, may receive candidates from respective schedulers, and may select an optimal scheduler from among the schedulers based on the candidates.

For example, when the allocation of resources by the master edge scheduler 112, corresponding to a first level, fails, the global edge scheduler 111 may allow the near edge scheduler 113 and the cloud scheduler 114 to simultaneously request a task at a second level scheduler in a contention mode, may receive candidates from respective schedulers, and may select an optimal scheduler from among the schedulers based on the candidates.

Figure 10:
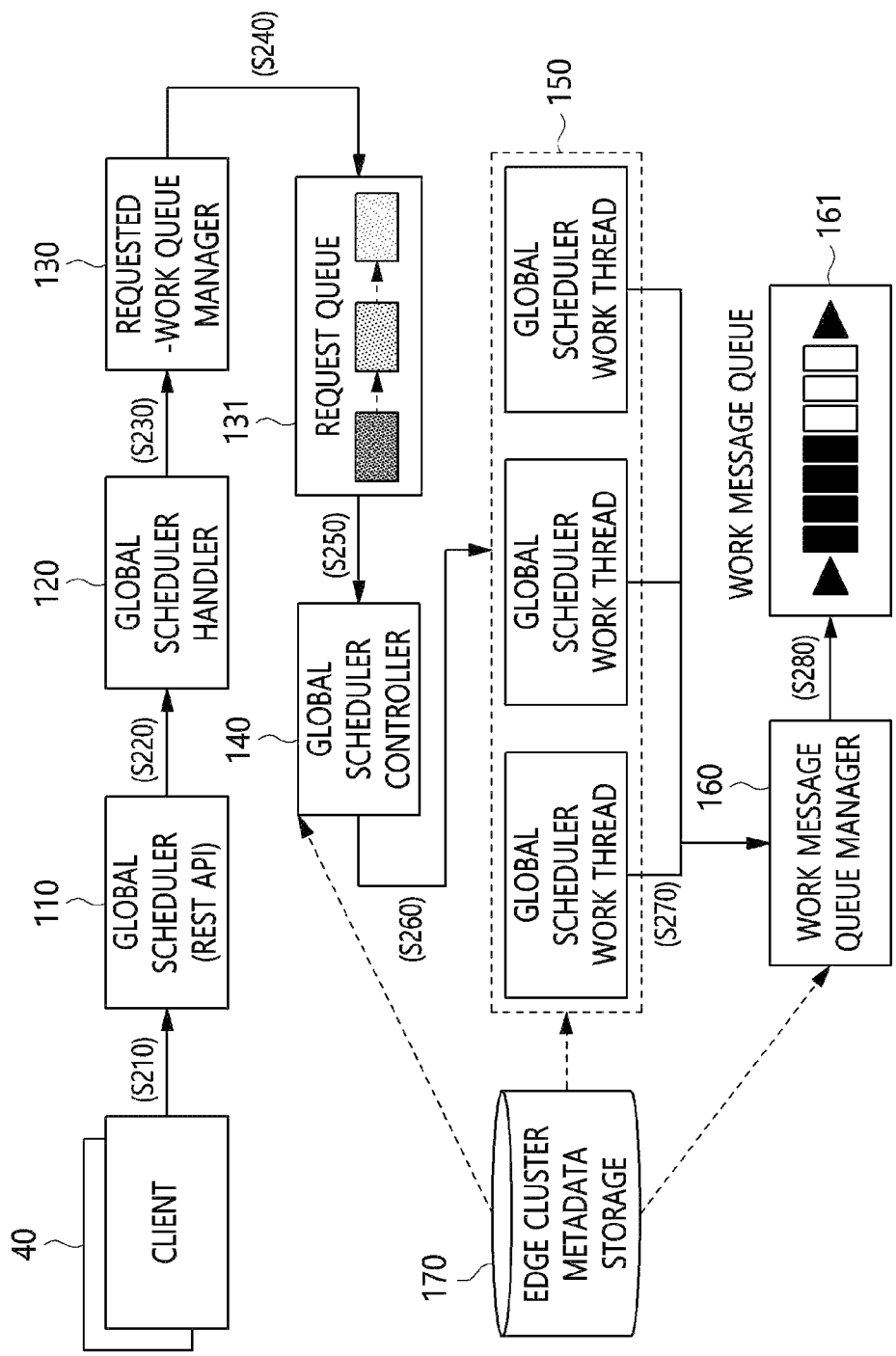
FIG. 10 is a block diagram illustrating the processing flow of an intelligent scheduling apparatus according to an embodiment of the present invention.
Figure 11:
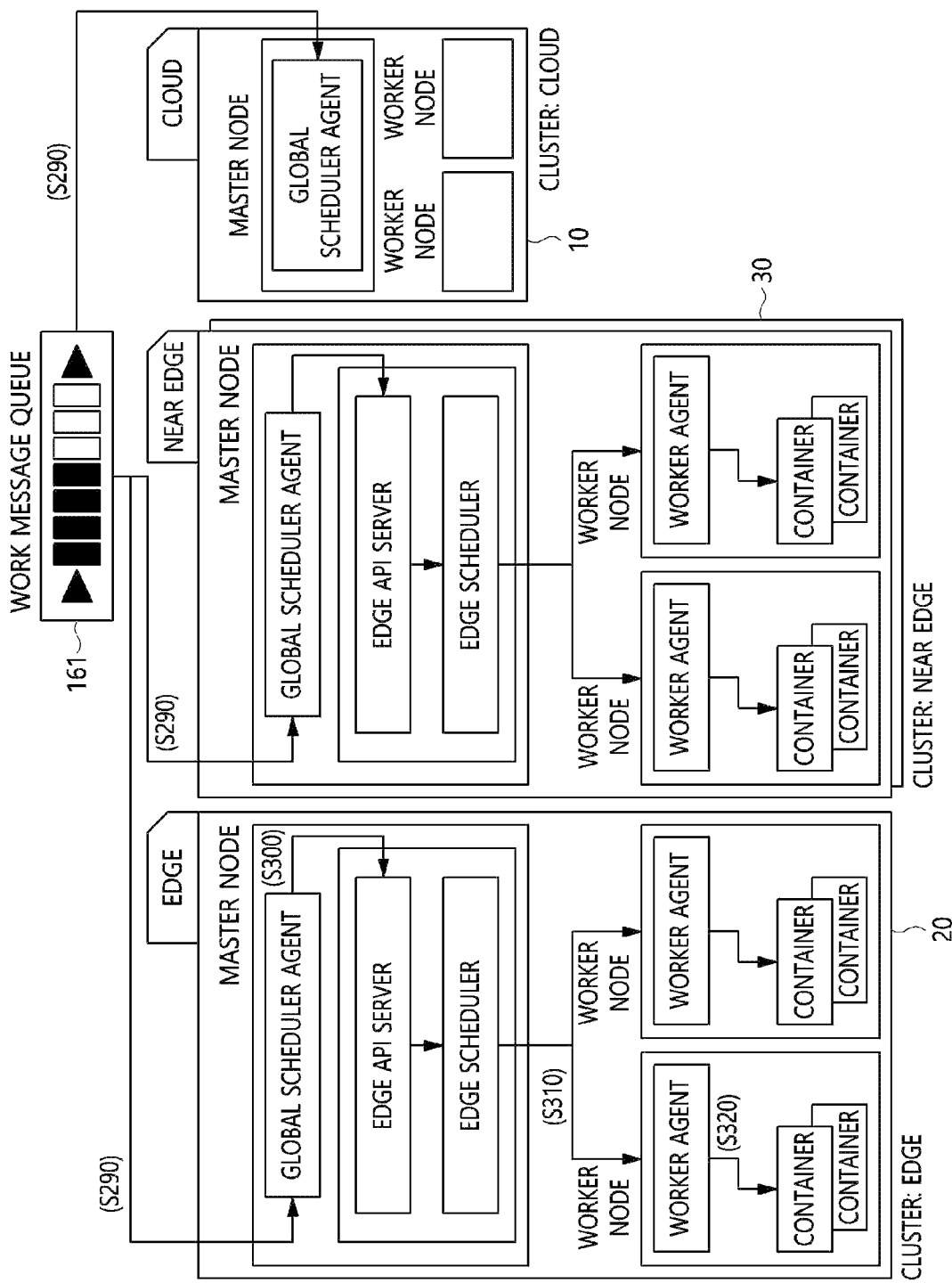
FIG. 11 is a block diagram illustrating the processing flow of an edge, a near edge, and a cloud, continued from the processing flow of the intelligent scheduling apparatus illustrated in FIG. 10.

FIG. 10 is a block diagram illustrating the processing flow of an intelligent scheduling apparatus according to an embodiment of the present invention, and FIG. 11 is a block diagram illustrating the processing flow of an edge, a near edge, and a cloud, continued from the processing flow of the intelligent scheduling apparatus illustrated in FIG. 10.

Referring to FIG. 10, a container requested by a client 40 may be generated and executed in a worker node at step S210.

That is, at step S210, the client 40 may make a REST API call corresponding to container generation to the global scheduler 110.

Next, at step S220, the global scheduler 110 may execute a global scheduler handler 120 corresponding to the called REST API.

At step S230, the global scheduler handler 120 may transmit the requested data to the requested-work queue manager 130.

At step S240, the requested-work queue manager 130 may store the requested data in the request queue 131.

At step S250, the global scheduler controller 140 may fetch data to be processed in consideration of priority from the request queue 131.

At step S260, the global scheduler controller 140 may generate multiple work threads in the global scheduler work thread 150, may transfer the data to be processed to the global scheduler work thread 150, and may then execute work queue scheduling.

At step S270, the global scheduler work thread 150 may analyze each requested task, and may send a message to be requested form the corresponding cluster 10, 20 or 30 to the work message queue manager 160.

At step S280, the work message queue manager 160 may store the received message in the work message queue 161.

Referring to FIG. 11, at step S290, the global scheduler agent may check whether any message corresponding to the edge system 20 or the near-edge system 30 is present in the work message queue 161, and may fetch the corresponding message.

At step S300, the global scheduler agent may analyze the fetched message, and may make the corresponding API call to the edge API server thereof.

At step S310, the edge scheduler may generate and execute the requested container through worker agents present in worker nodes.

Steps S210 to S310 may be included in the scheduler policy running step of FIG. 4.

Figure 12:
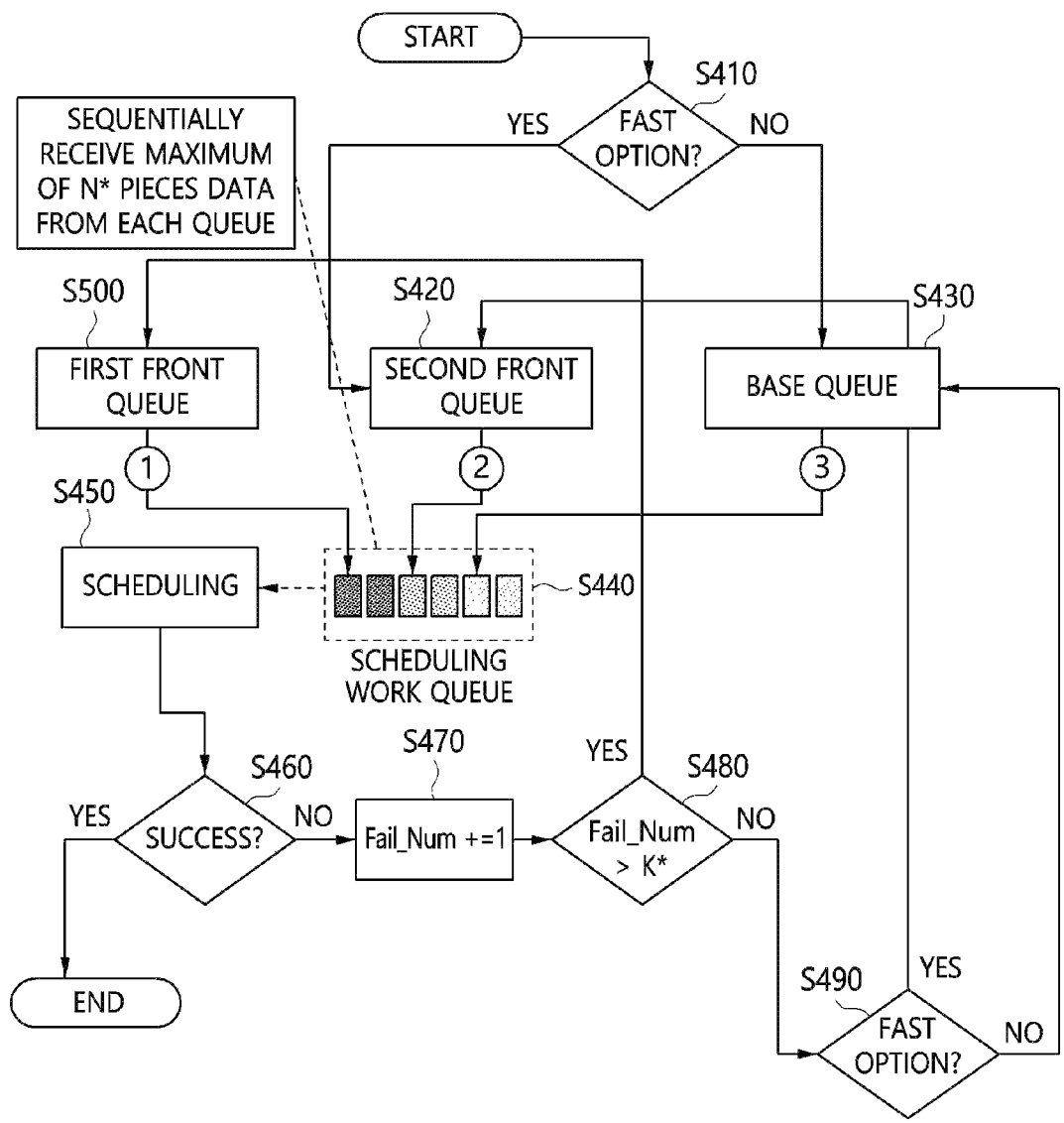
FIG. 12 is an operation flowchart illustrating in detail an example of the work queue scheduling step illustrated in FIG. 11.

FIG. 12 is an operation flowchart illustrating in detail an example of the work queue scheduling step illustrated in FIG. 11.

Referring to FIG. 12, at steps S260 to S280 illustrated in FIG. 11, at the work queue scheduling step, scheduling of tasks (work) has been requested by the work message queue 161, but a sub-step of processing requests by dividing the work message queue 161 into three stages in order to primarily process the task for a request that has repeatedly failed and to process a request having a priority option in preference to a basic scheduling request is illustrated.

The 3-step work message queue 161 may include a first front queue, a second front queue, and a base queue.

The first front queue may be a queue for primarily processing a request that has repeatedly failed.

A second front queue may be a queue to be processed with higher priority than that of a basic scheduling request.

Processing of the 3-step work queue by an edge scheduler policy runner may be performed based on the following rules.

First, at step S410, it may be checked whether priority option (FAST option) is present in the requested data, when it is checked that there is a priority option, data may be stored in the second front queue at step S420, and when there is no priority option, the data may be stored in a base queue at step S430.

At step S440, the data stored in the first front queue, the second front queue, and the base queue may be stored in the work message queue 161.

At step S450, whether pieces of data are present in the queues in the order of the first front queue, the second front queue, and the base queue may be checked, and a preset number (N*) of tasks may be sequentially generated from each queue in a scheduling work queue, and thus the scheduling task (work) may be processed.

At step S460, when scheduling succeeds, the work queue processing procedure may be terminated, whereas when scheduling fails, the number of failures in each request (Fail_Num) may be increased by 1 at step S470. Whether the number of failures is equal to or greater than the preset number of failures (K*) may be determined at step S480. When the number of failures is equal to or greater than the preset number of failures (K*), the data may be stored in the first front queue at step S500.

Here, at step S480, when the number of failures is less than the preset number of failures (K*), and a priority option is present, data may be stored in the second front queue at step S420. When there is no priority option, data may be stored in the base queue at step S430.

The work queue scheduling step of the work queue illustrated in FIG. 12 may be repeated until all request data remaining in the 3-step work queue is processed, and the work queue may wait for request data when there is no data.

Figure 13:
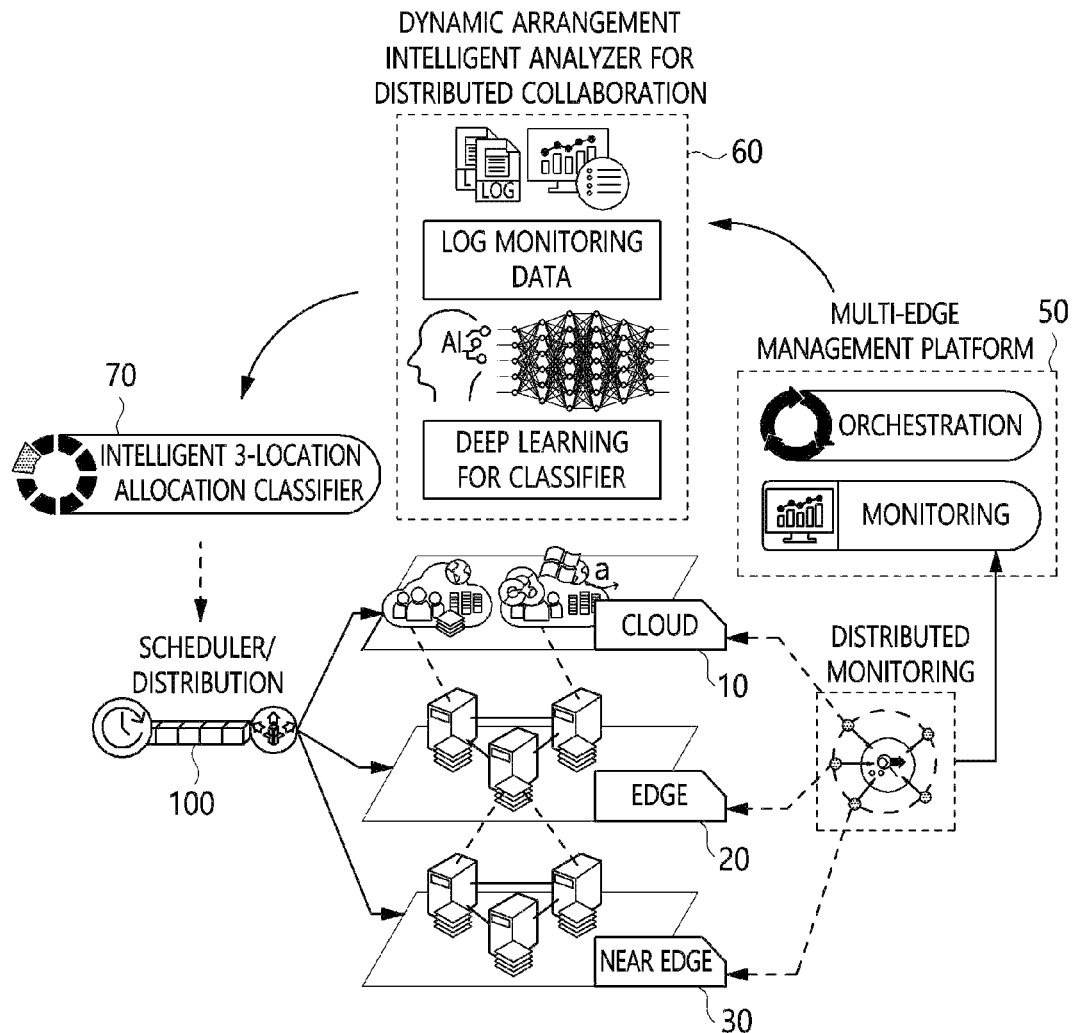
FIG. 13 is a diagram illustrating dynamic arrangement for distributed collaboration between services based on an intelligent scheduler according to an embodiment of the present invention.

FIG. 13 is a diagram illustrating dynamic arrangement for distributed collaboration between services based on an intelligent scheduler according to an embodiment of the present invention.

Referring to FIG. 13, schedulers of the intelligent scheduling apparatus 100 according to an embodiment of the present invention may be provided as intelligent schedulers other than fixed schedulers.

The intelligent scheduling apparatus 100 according to an embodiment of the present invention may further include an intelligent analyzer 180 which collects real-time monitoring data and logs for the cloud 10, the edge system 20, and the near-edge system 30, and may dynamically arrange various services from the collected data using the intelligent scheduler through AI analysis such as deep learning.

The intelligent analyzer 180 may need a large amount of history data when deriving an intelligent scheduler policy through artificial intelligence training.

Here, the intelligent analyzer 180 may construct an edge service system, and may not immediately perform artificial intelligence training, but may train an edge scheduler policy after the history data has been collected for a predetermined period of time.

Figure 14:
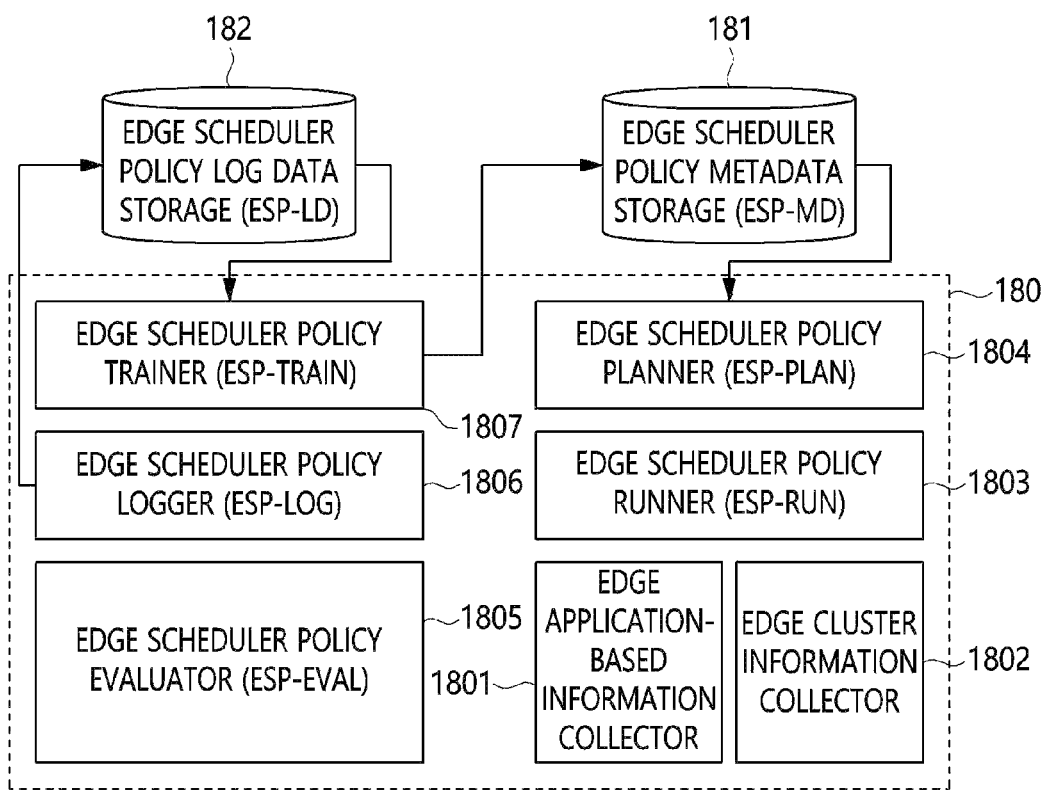
FIG. 14 is a block diagram illustrating an intelligent scheduling apparatus to which an intelligent scheduler is applied according to an embodiment of the present invention.

FIG. 14 is a block diagram illustrating an intelligent scheduling apparatus to which an intelligent scheduler is applied according to an embodiment of the present invention.

Referring to FIG. 14, the intelligence analyzer 180 included in the intelligent scheduler according to an embodiment of the present invention is illustrated in detail.

The intelligent analyzer 180 may include an edge application-based information collector 1801, an edge cluster information collector 1802, an edge scheduler policy runner 1803, an edge scheduler policy planner 1804, an edge scheduler policy evaluator 1805, an edge scheduler policy logger 1806, and an edge scheduler policy trainer 1807.

The intelligent analyzer 180 may store metadata and scheduler policy logs in edge scheduler policy metadata storage 181 and edge scheduler policy log data storage 182.

The edge scheduler policy metadata storage 181 may store edge scheduler policies (ESP).

The edge scheduler policy log data storage 182 may store the results of applying each edge scheduler policy through the edge scheduler policy logger.

The edge application-based information collector 1801 may collect resource information, such as a response speed, an actual CPU use rate, an actual memory use rate, and other resource usage status, for each application run by an edge.

The edge cluster information collector 1802 may collect resource information, such as an actual CPU use rate and an actual memory use rate, for each of physical nodes constituting a cluster.

The edge scheduler policy runner 1803 may run the best policy by applying various edge scheduler policies and then evaluating the edge scheduler policies depending on the degree of optimization.

The edge scheduler policy planner 1804 may establish a plan for running the policy based on the information collected by the edge application-based information collector 1801 and the edge cluster information collector 1802.

The edge scheduler policy evaluator 1805 may evaluate the edge scheduler policies and then evaluate the scheduler policies depending on the degree of optimization.

The edge scheduler policy logger 1806 may store the run scheduler policies and the results of running the scheduler policies in the form of logs.

The edge scheduler policy trainer 1807 may fetch history data from the edge scheduler policy log data storage 182, and may then train the corresponding scheduler policy.

Figure 15:
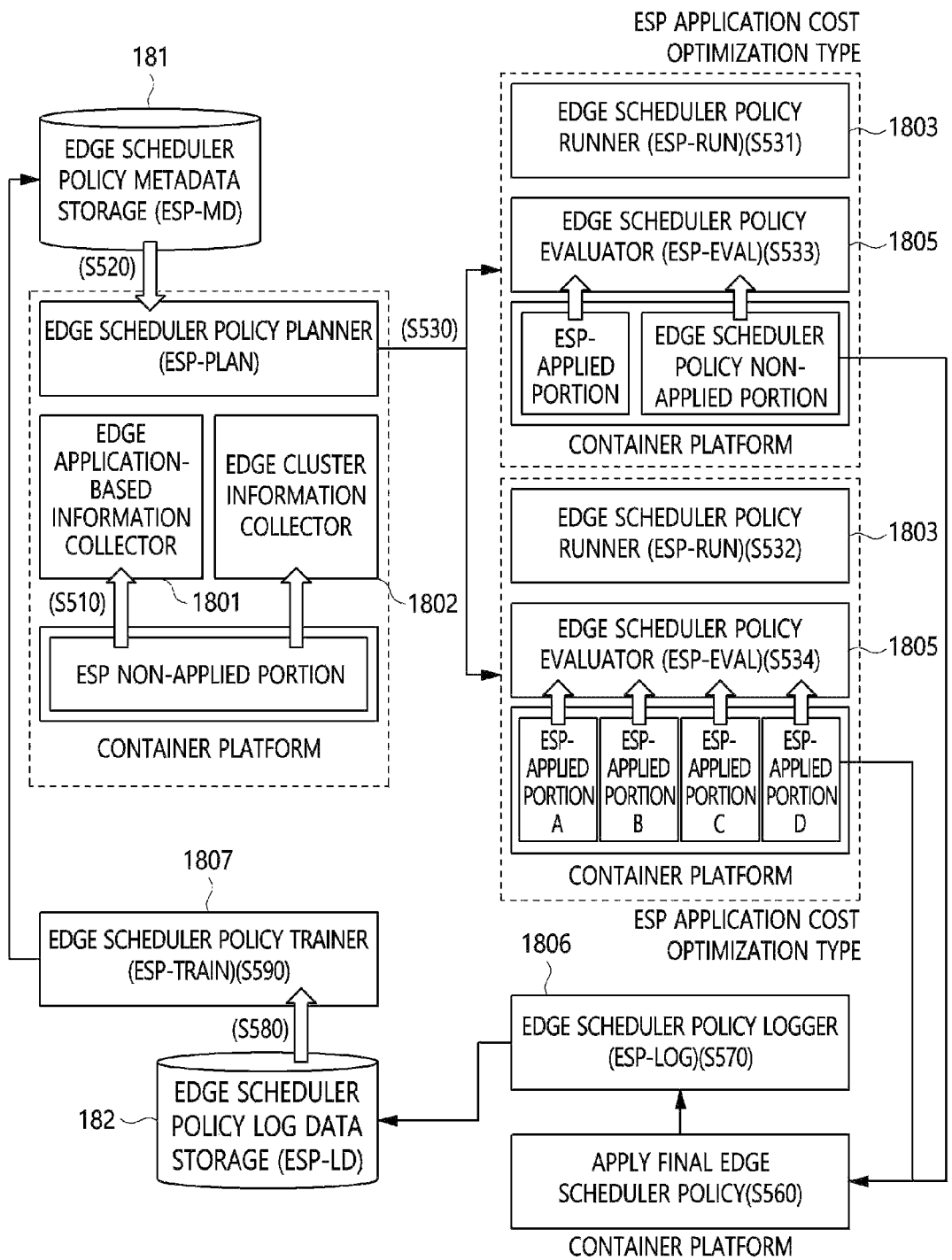
FIG. 15 is a block diagram illustrating the optimization flow of an intelligent scheduler according to an embodiment of the present invention.

FIG. 15 is a block diagram illustrating the optimization flow of an intelligent scheduler according to an embodiment of the present invention.

Referring to FIG. 15, an example of the intelligent scheduling training step S1103 of the intelligent scheduling method to which the intelligent analyzer 180 is applied is illustrated in detail.

The key point of intelligent scheduling is to provide both a method for optimizing scheduling at minimum cost and a method for optimizing scheduling at maximum speed.

First, at step S510, information of a container platform may be collected through the edge application-based information collector 1801 and the edge cluster information collector 1802.

At step S520, the edge scheduler policy planner 1804 may select a policy from the edge scheduler policy metadata storage 181 based on the information collected at step S510.

At step S530, one of an ESP application cost minimization type and an ESP application optimization type may be selected based on resource information identical to the load degree of the container platform.

At step S540, containers may be assigned through the edge scheduler policy runner 1803.

At step S550, each scheduler policy may be evaluated through a relative comparison between the state before the edge scheduler policy is applied and the state after the edge scheduler policy has been applied.

Step S560 may be applied to all schedulers so that there are no portions to which the finally selected edge scheduler policy is not applied.

At step S570, the results of evaluating the scheduler policies may be stored in the edge scheduler policy log data storage 182 through the edge scheduler policy logger 1806.

At step S580, the edge scheduler policy trainer 1807 may collect the edge scheduler policy log data stored in the edge scheduler policy log data storage 182.

At step S590, the edge scheduler policy trainer 1807 may generate an optimized intelligent scheduler policy by performing scheduler policy training.

Figure 16:
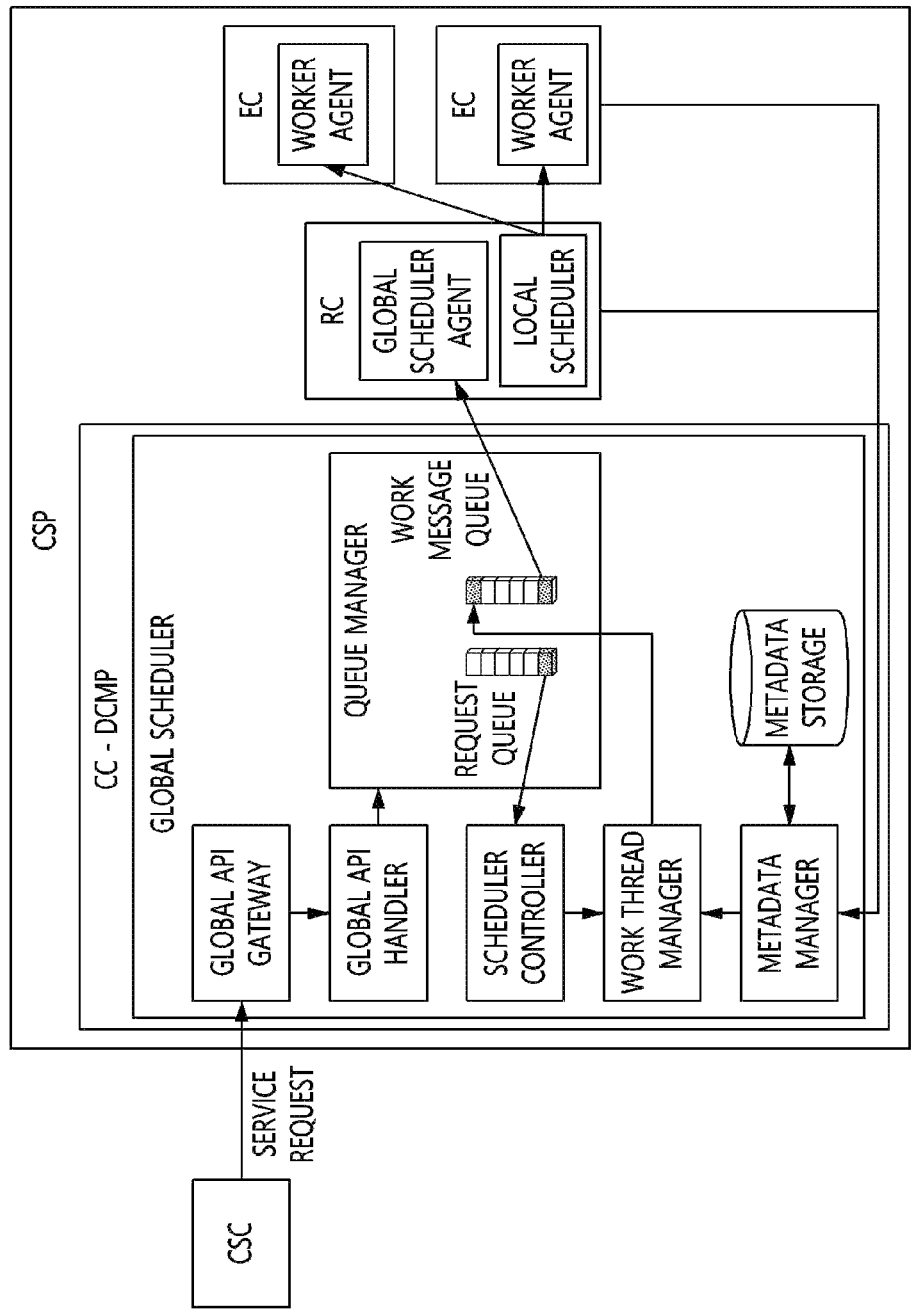
FIG. 16 is a diagram illustrating intelligent scheduling between a cloud service customer and a cloud service provider according to an embodiment of the present invention.

FIG. 16 is a diagram illustrating intelligent scheduling between a cloud service customer and a cloud service provider according to an embodiment of the present invention.

Referring to FIG. 16, it can be seen that the intelligent scheduling apparatus and method according to embodiments of the present invention are applied to a cloud service customer (CSC) and a cloud service provider (CSP) in cloud computing.

The cloud service provider may indicate a management structure for global scheduling for services between a center cloud (CC), a region cloud (RC), and an edge cloud (EC).

The cloud service provider may include the following detailed components of a global scheduler for running the global scheduler.

A global API gateway may provide an API gateway for an application allocation and execution request service.

A global API handler may process a global scheduler API.

A queue manager may receive an allocation request message and a work message for a service to be actually executed from the global scheduler handler, and may store the received messages.

A scheduler controller may fetch a scheduling message from the request queue, generate a global scheduler work thread, and run the global scheduler work thread.

A work thread manager may convert the type of message to be transferred to the corresponding global scheduler agent, and may store the converted message in the work message queue.

Metadata storage may store metadata of a distributed cloud.

A work message queue may store work messages to be executed on the region and edge clouds.

A global scheduler agent may receive a scheduler work message corresponding thereto from the work message queue, and may make the corresponding API call.

A local scheduler may detect a cloud that is not allocated, and may select a worker node so as to execute an application service.

A worker agent may execute a container in a node.

In the distributed cloud, a process for generating and executing an application service requested by the CSC is first performed such that the CSC makes an API call to generate an application.

Here, the global scheduler handler corresponding to the called API may be executed.

Here, the global API handler may transmit the requested data to the queue manager.

Here, the queue manager may store the requested data in the queue.

Here, the scheduler controller may fetch data to be processed in consideration of priority in the request queue.

Here, the global scheduler controller may generate a work thread, transfer data to be processed, and execute the scheduling work (task).

Here, the work thread manager may analyze a requested task, and may request the corresponding cluster by sending a message to the queue manager.

Here, the queue manager may store the received message in the work message queue.

Here, the global scheduler agent may check whether a message corresponding to an edge cloud or a local cloud is present in the work message queue, and may fetch the corresponding message.

Here, the global scheduler agent may analyze the fetched message, and may make the corresponding API call to the local scheduler.

The local scheduler may generate and execute the requested application service through the worker agent of the worker node.

Here, the CSP may provide global scheduling based on the application to be executed.

Here, the CSP may provide API management so that the API can be immediately processed.

For example, the CSC may request an API for an application service, and the API handler for global scheduling may then store and manage a request message in a queue for a fast response.

Here, the CSP may manage a policy to be generated or reflected for global scheduling.

For example, the global scheduling policy may include a task (work) priority, task preference, resource usage amount, etc.

The CSP may provide and manage metadata storage in which resource information is stored in a region cloud and an edge cloud.

For example, the resource information of the cloud includes a cloud service type, a usage amount, etc., and may be managed in a form in which the CSP monitors the region cloud and the edge cloud.

Here, the CSP may provide the management of queues for task priority.

For example, the queues for global scheduling may include a CSC request message queue, a work message queue, etc.

Here, the CSP may provide a connection management function for distributed resources and global scheduling.

The connection management for global scheduling may manage a connection protocol or a connection agent so as to utilize the distributed resources of the region cloud or the edge cloud.

Also, the agent of the region cloud or the edge cloud may automatically receive messages from the work message queue for global scheduling.

Figure 17:
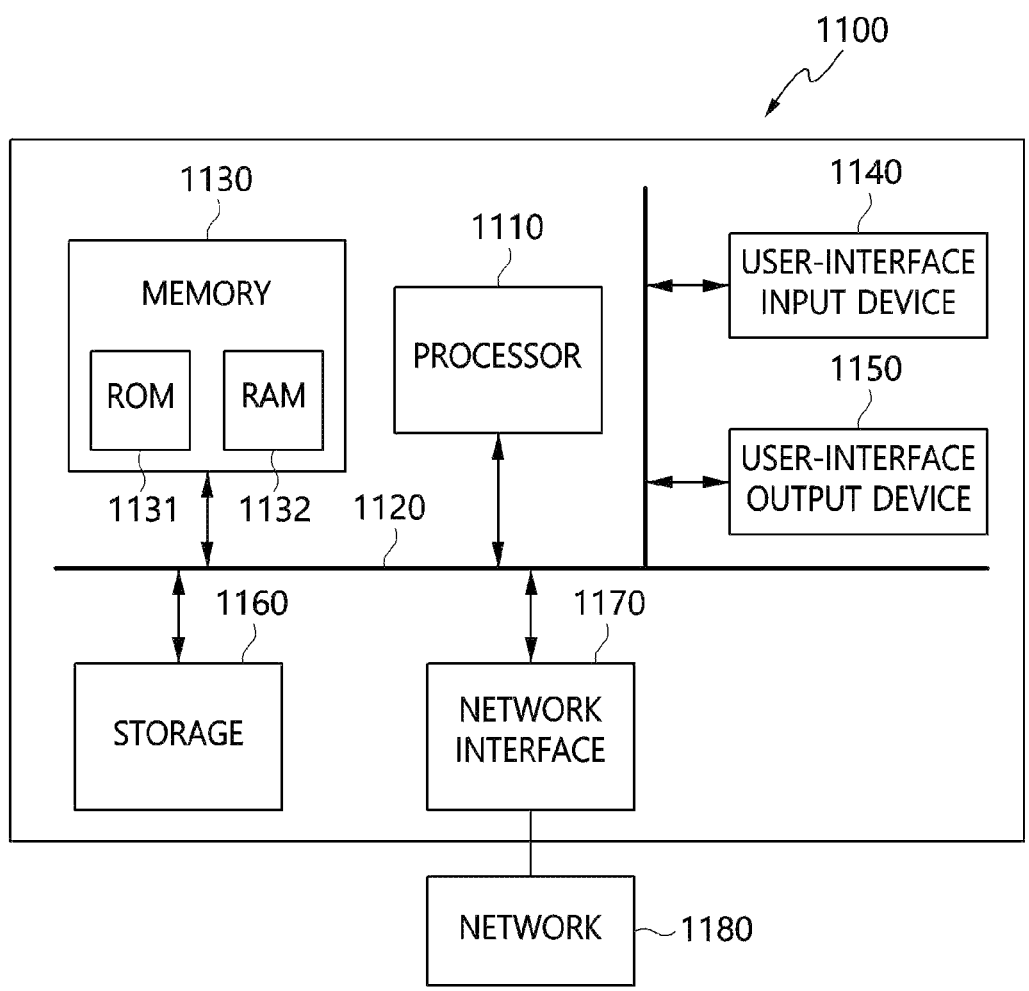
FIG. 17 is a diagram illustrating a computer system according to an embodiment of the present invention.

FIG. 17 is a diagram illustrating a computer system according to an embodiment of the present invention.

Referring to FIG. 17, an intelligent scheduling apparatus according to an embodiment of the present invention may be implemented in a computer system 1100, such as a computer-readable storage medium. As illustrated in FIG. 9, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Here, the intelligent scheduling apparatus according to an embodiment of the resent invention may include one or more processors 1110 and execution memory 1130 for storing at least one program that is executed by the one or more processors 1110, wherein the at least one program is configured to, in a hybrid cloud environment including a cloud, an edge system, and a near-edge system, configure schedulers for scheduling tasks of the cloud, the edge system, and the near-edge systems, store data, requested by a client, in a work queue by controlling the schedulers based on a scheduler policy and process the tasks based on data stored in the work queue, and collect history data resulting from processing of the tasks depending on the scheduler policy, and train the scheduler policy based on the history data.

Here, the at least one program may be configured to configure the schedulers so that the tasks are processed using at least one of series connection and parallel connection of the schedulers.

Here, the at least one program may be configured to configure the schedulers so that the tasks are complexly processed using both the series connection and parallel connection of the schedulers.

Here, the at least one program may be configured to sequentially transfer the tasks to the schedulers depending on whether resource allocation by schedulers configured in the series connection has succeeded.

Here, the at least one program may be configured to request an identical task from at least two of schedulers configured in parallel connection and transfer the tasks to an optimal scheduler, which is determined to be any one of the at least two schedulers.

Here, the at least one program may be configured to store data, requested by the client, in multiple work queues according to a priority and schedule the data stored in the work queues.

Here, the at least one program may be configured to, when a number of failures in a work request for the data requested by the client is equal to or greater than a preset number of times, store the data in a work queue for processing the work request with higher priority.

Here, the at least one program may be configured to, when a number of failures in scheduling of the data stored in a corresponding work queue is equal to or greater than a preset number of times, transfer the data to a subsequent work queue, and perform scheduling on the data transferred to the subsequent work queue.

Here, the at least one program may be configured to collect resource information of the cloud, the edge system, and the near-edge system, and generate the history data from the resource information and results of running the scheduler policy.

Here, the at least one program may be configured to establish a running plan for the scheduler policy based on the resource information, and train the scheduler policy from results of applying the scheduler policy running plan.

The present invention may provide intelligent scheduling for optimizing vertical and horizontal cloud-edge collaboration.

Further, the present invention may provide augmented reality (AR)/virtual reality (VR), video surveillance, emergency disaster management service, and ultra-low latency intelligent information service requiring high response speeds, such as a smart city and a connected car, by optimizing vertical and horizontal cloud-edge collaboration.

Furthermore, the present invention may generate an efficient intelligent scheduler policy based on integrated distributed processing, including a cloud, an edge, and a near edge, and logs or statistical information.

As described above, in the intelligent scheduling apparatus and method according to the present invention, the configurations and schemes in the above-described embodiments are not limitedly applied, and some or all of the above embodiments can be selectively combined and configured so that various modifications are possible.

What is claimed is:

1. An intelligent scheduling apparatus, comprising:
   one or more processors; and
   an execution memory for storing at least one program that is executed by the one or more processors,
   wherein the at least one program is configured to:
   in a hybrid cloud environment including a cloud, an edge system, and a near-edge system, configure schedulers for scheduling tasks of the cloud, the edge system, and the near-edge systems;
   receive a request from a client;
   store data for the request in a request queue;
   retrieve, from the request queue, the stored data for scheduling and generate a work thread based on the retrieved data;
   convert the work thread to a message;
   store the message in a work message queue for scheduling the tasks of the cloud, the edge system, and the near-edge systems in the hybrid cloud environment; and
   fetch the message in the work message queue;
   wherein the at least one program is configured to provide a connection management for the scheduling tasks,
   wherein the connection management manages agents in the edge system or the near-edge systems,
   wherein at least one of the agents is configured to receive the message from the work message queue and utilize resources of the edge system or the near-edge systems,
   wherein the at least one program is configured to collect resource information of the cloud, the edge system, and the near-edge system.

2. The intelligent scheduling apparatus of claim 1,
   wherein the hybrid cloud environment includes a global schedule agent, and
   wherein the at least one of the agents receives the fetched message; and distributes, for scheduling, the work thread based on the fetched message for global scheduling.

3. An intelligent scheduling method performed by an intelligent scheduling apparatus storing at least one program that is executed by one or more processors, the intelligent scheduling method comprising:
   in a hybrid cloud environment including a cloud, an edge system, and a near-edge system, configuring schedulers for scheduling tasks of the cloud, the edge system, and the near-edge systems,
   receiving a request from a client;
   storing data for the request in a request queue;
   retrieving, from the request queue, the stored data for scheduling and generating a work thread based on the retrieved data;
   converting the work thread to a message;
   storing the message in a work message queue for scheduling the tasks of the cloud, the edge system, and the near-edge systems in the hybrid cloud environment; and
   fetching the message in the work message queue;
   wherein the at least one program is configured to provide a connection management for the scheduling tasks,
   wherein the connection management manages agents in the edge system or the near-edge systems,
   wherein at least one of the agents is configured to receive the message from the work message queue and utilize resources of the edge system or the near-edge systems,
   wherein the at least one program is configured to collect resource information of the cloud, the edge system, and the near-edge system.

4. The intelligent scheduling method of claim 3,
   wherein the at least one of the agents receives the fetched message; and distributes, for scheduling, the work thread based on the fetched message for global scheduling.

* * * * *